(12) United States Patent
Knudson

(10) Patent No.: US 6,425,562 B1
(45) Date of Patent: Jul. 30, 2002

(54) GOLF CLUB WASHER MOUNTING APPARATUS

(76) Inventor: William Knudson, 3750 Lakeside Dr., Reno, NV (US) 89509

( * ) Notice: Subject to any disclaimer, the term of this patent is extended or adjusted under 35 U.S.C. 154(b) by 0 days.

(21) Appl. No.: 09/571,973

(22) Filed: May 16, 2000

(51) Int. Cl.$^7$ ............................................. A47B 96/06
(52) U.S. Cl. .............................. 248/230.1; 248/230.2; 248/220.21; 248/230.4
(58) Field of Search .......................... 248/230.1, 230.4, 248/231.51, 230.2, 231.21, 231.31, 220.21, 220.22, 218.4; 182/129

(56) References Cited

U.S. PATENT DOCUMENTS

| | | | | |
|---|---|---|---|---|
| 146,988 A | * | 2/1874 | Church et al. ......... | 248/231.41 |
| 548,422 A | * | 10/1895 | Beardsley ................ | 248/230.4 |
| 2,062,156 A | * | 11/1936 | Zerbst ........................ | 248/488 |
| 2,233,911 A | * | 3/1941 | Carson .................. | 248/229.11 |
| 3,119,533 A | * | 1/1964 | Kimes et al. .................. | 15/105 |
| 3,269,683 A | * | 8/1966 | Shinaver ................ | 248/230.5 |
| 3,734,439 A | * | 5/1973 | Wintz ......................... | 131/241 |
| 3,840,204 A | * | 10/1974 | Thomas et al. ............. | 131/241 |
| 4,464,072 A | | 8/1984 | Norwell | |
| 4,616,797 A | * | 10/1986 | Cramer .................... | 248/227.4 |
| 4,965,906 A | | 10/1990 | Mauro | |
| 5,152,489 A | * | 10/1992 | Christensen et al. .......... | 211/14 |
| 5,155,883 A | | 10/1992 | Legault | |
| 5,184,911 A | * | 2/1993 | Wu ............................. | 403/385 |
| 5,190,257 A | * | 3/1993 | Gradei et al. .......... | 248/231.71 |
| 5,313,866 A | * | 5/1994 | Smith .......................... | 84/327 |
| 5,484,129 A | * | 1/1996 | Megal ......................... | 224/274 |
| 5,572,761 A | | 11/1996 | Meyer | |
| 5,758,379 A | | 6/1998 | Hovnanian | |
| 5,806,122 A | | 9/1998 | Bogle et al. | |
| 6,036,386 A | * | 3/2000 | McDonald .................... | 401/10 |
| 6,325,350 B1 | * | 12/2001 | Mancuso .................... | 224/274 |
| 6,345,794 B1 | * | 2/2002 | Varner ......................... | 223/68 |

FOREIGN PATENT DOCUMENTS

JP          6190094 A   *   7/1994

* cited by examiner

Primary Examiner—Leslie A. Braun
Assistant Examiner—Naschica S Morrison
(74) Attorney, Agent, or Firm—Siemens Patent Service, LC

(57) ABSTRACT

A bracket for suspending a washing basin from a cart having an upwardly extending frame member. The bracket includes a connector for engaging the frame member. In alternative embodiments, the connector is either a clamp operated by threaded fasteners, or a sleeve which encircles the frame member, the sleeve having an adapter which occupies the interior of the sleeve and cooperates closely with both the sleeve and with frame members of different cross sectional configurations. A stop prevents the sleeve from sliding downwardly along the frame member of the cart. Two rods project laterally from the sleeve on opposite sides thereof. One support arm is pivotally supported from each rod. The support arms have eyes for receiving fasteners which are threaded into the washing basin. The support arms are configured to support the washing basin at about a forty-five degree angle to a horizontal direction. The support arms are readily releasably attached to their respective rods.

5 Claims, 6 Drawing Sheets

GOLF CLUB WASHER MOUNTING APPARATUS

BACKGROUND OF THE INVENTION

1. Field of the Invention

The present invention relates to the field of mounting washing apparatus to environmental objects, and more particularly to suspending washing apparatus to mobile carts having tubular frames. In a broad sense, the present invention provides a mounting bracket and an associated adapter enabling articles adapted to accept screws from the bottom thereof to be mounted to any structure having a tubular frame including a generally vertical tubular post. In an exemplary application, a golf club washer is mounted to a golf cart.

2. Description of the Prior Art

Golfers playing on golf courses must usually carry their clubs and other golf equipment on wheeled carts, since volume and weight of the equipment exceeds that easily carried on the body. A golf club head washer is frequently encountered among the various types of golf related equipment which are carried with the player. A club washer usually includes a basin and a supply of cleaning fluid such as water. While a club washer can be carried anywhere in a cart, it is convenient to have the washer readily at hand so that a club may be cleaned immediately and expeditiously.

The prior art has proposed various golf ball and club washers, and has set forth some ways of attaching the same to golf carts. In one example, U.S. Pat. No. 5,155,883, issued to Raymond L. Legault on Oct. 20, 1999, shows a golf club cleaner adapted for clamped mounting to a golf cart. The clamp has an L-shaped jaw slidably engaging the liquid receptacle of the cleaner. The jaw closes over any suitable member of a golf cart. The device of Legault lacks a fully encircling sleeve or clamp which secures the novel bracket to a tubular frame member of a golf cart, as well as the bracket itself.

U.S. Pat. No. 5,758,379, issued to Vahak Stephan Hovnanian on Jun. 2, 1998, describes a golf ball washer which is adhered to a golf cart by a suction cup. This approach requires presence of a smooth, flat surface on the golf cart. By contrast, the present invention comprises a bracket having a mounting adapter surroundably engaging tubular members of the golf cart.

U.S. Pat. No. 5,572,761, issued to Roy Meyer on Nov. 12, 1996, describes a golf ball and club cleaner cup which is secured to a golf bag by a clip. By contrast, the present invention sets forth a bracket for mounting to tubular frame members of a golf cart.

U.S. Pat. No. 4,965,906, issued to Edward Mauro on Oct. 30, 1990, shows a golf ball and club cleaner which rests on a flat surface, such as the fender of a golf cart, on short legs. There is no connection of the cleaner to the cart. The present invention provides for direct connection of the cleaner to a frame member of the cart. There is no bracket in the device of Mauro.

U.S. Pat. No. 4,464,072, issued to John B. Norwell on Aug. 7, 1984, shows a cleaning device for golf clubs which device includes a holder comprising straps. The holder is similar to a harness formed from generally rigid straps, and has a clip to attach the harness to a golf bag. This device lacks the apparatus for engaging tubular frame members of a golf cart, as well as two spaced apart arms bearing eyes for receiving screws, both being features of the present invention.

U.S. Pat. No. 5,806,122, issued to Evard Bogle et al. On September 15, describes a device having a golf ball washer and auxiliary features. The washer is asserted to be attachable to a golf cart. However, no structure for accomplishing attachment is disclosed. The present invention sets forth a bracket for engaging a ball washer and apparatus for securing the bracket to tubular frame members of a golf cart.

The prior art has failed to set forth attachment apparatus adapted to grasp a vertical tubular frame member of a golf cart for the purpose of securing a washing device, and a suitable bracket fixed to the attachment apparatus and disposed to adjustably receive the receptacle of a washer, as seen in the present invention.

None of the above inventions and patents, taken either singly or in combination, is seen to describe the instant invention as claimed.

SUMMARY OF THE INVENTION

The present invention sets forth a bracket arrangement for securing a washer to a frame member of a golf cart, which frame member extends upwardly. The novel structure includes a component for engaging the frame and support arms extending beneath the washer. The support arms have eyelets for receiving screws which fasten the washer to the arms.

The component which engages the frame comprises in alternative embodiments, a sleeve and an adapter which is inserted into the sleeve, or a clamp. In the first alternative embodiment, the adapter adapts the sleeve to circular and polygonal frame members. The sleeve encircles the frame member and is prevented from sliding downwardly by a stop. The support arms are mounted in gimballing fashion to the sleeve. The washer therefore is held at the same angle to horizontal regardless of inclination, within limits, of the frame member of the golf cart. In the second alternative embodiment, the clamp utilizes threaded fasteners to close over the frame member. The support arms operate in gimballing fashion similarly to the embodiment employing the sleeve and adapter.

The support arms are removably attached to the sleeve utilizing components such as, in alternative embodiments, wing nuts and spring releases. The arms are thus readily assembled to and removed from the sleeve. The entire bracket assembly is readily assembled and disassembled using no more than a few ordinary hand tools.

The novel bracket can be attached to a cart without altering the cart, such as by drilling holes therein. It is readily removed from a cart, and is quite portable. Because of gimballing support of the washer and readily assembled and disassembled fasteners, the novel bracket is nearly universally usable with different models and configurations of golf and other carts having generally vertical or upwardly extending exposed frame members.

Accordingly, it is one object of the invention to provide a bracket suitable for mounting a washer to a golf cart.

It is another object of the invention to engage a frame member of the cart, and to avoid altering the frame member, such as by drilling holes therein.

It is a further object of the invention that the novel bracket be nearly universally applicable to diverse golf carts.

Still another object of the invention is to assure that a washer be supported in the same position from any of many different golf carts.

An additional object of the invention is that the novel bracket be readily assembled and disassembled.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
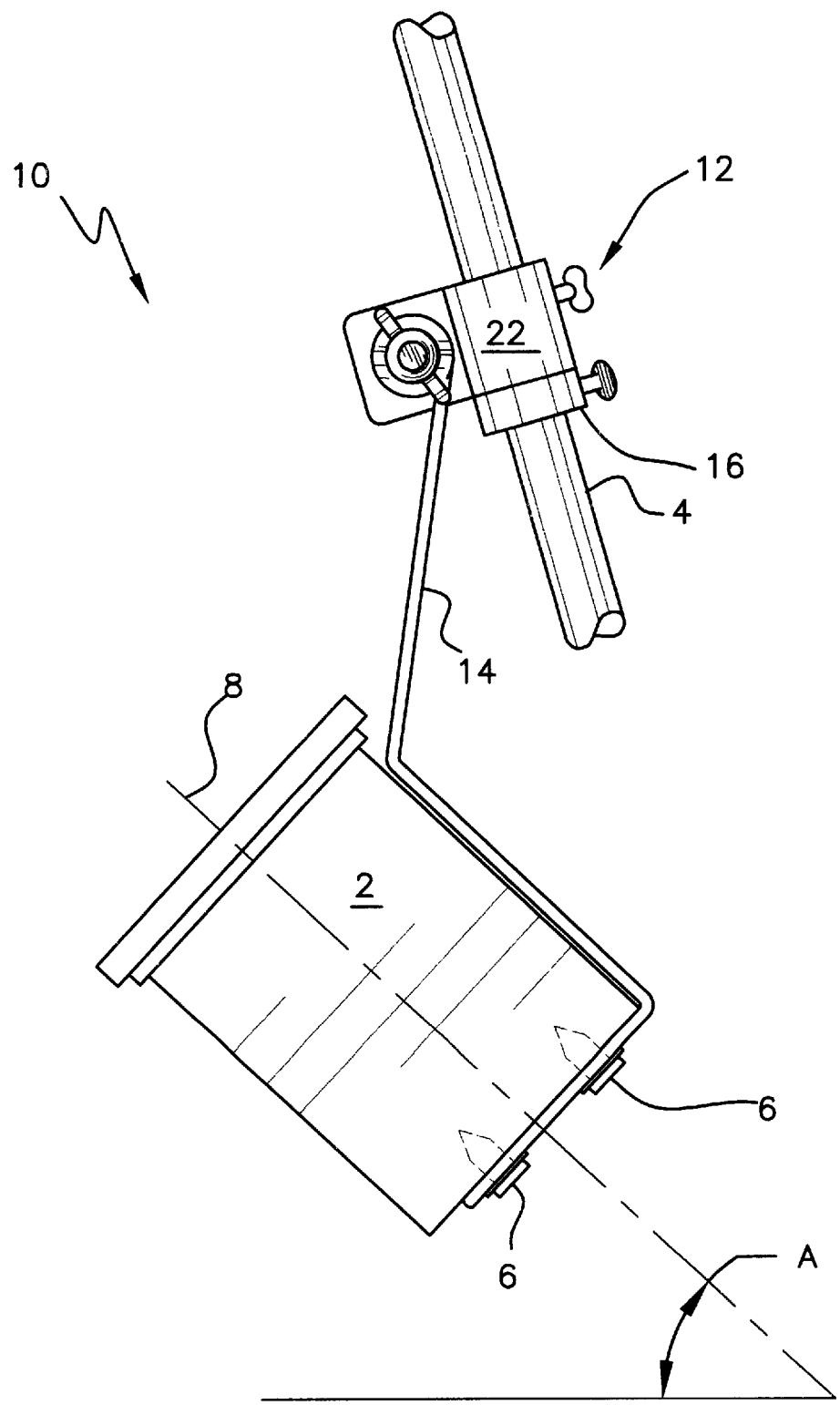
FIG. 1 is an environmental, side elevational view of a bracket accord to the present invention.
Figure 2:
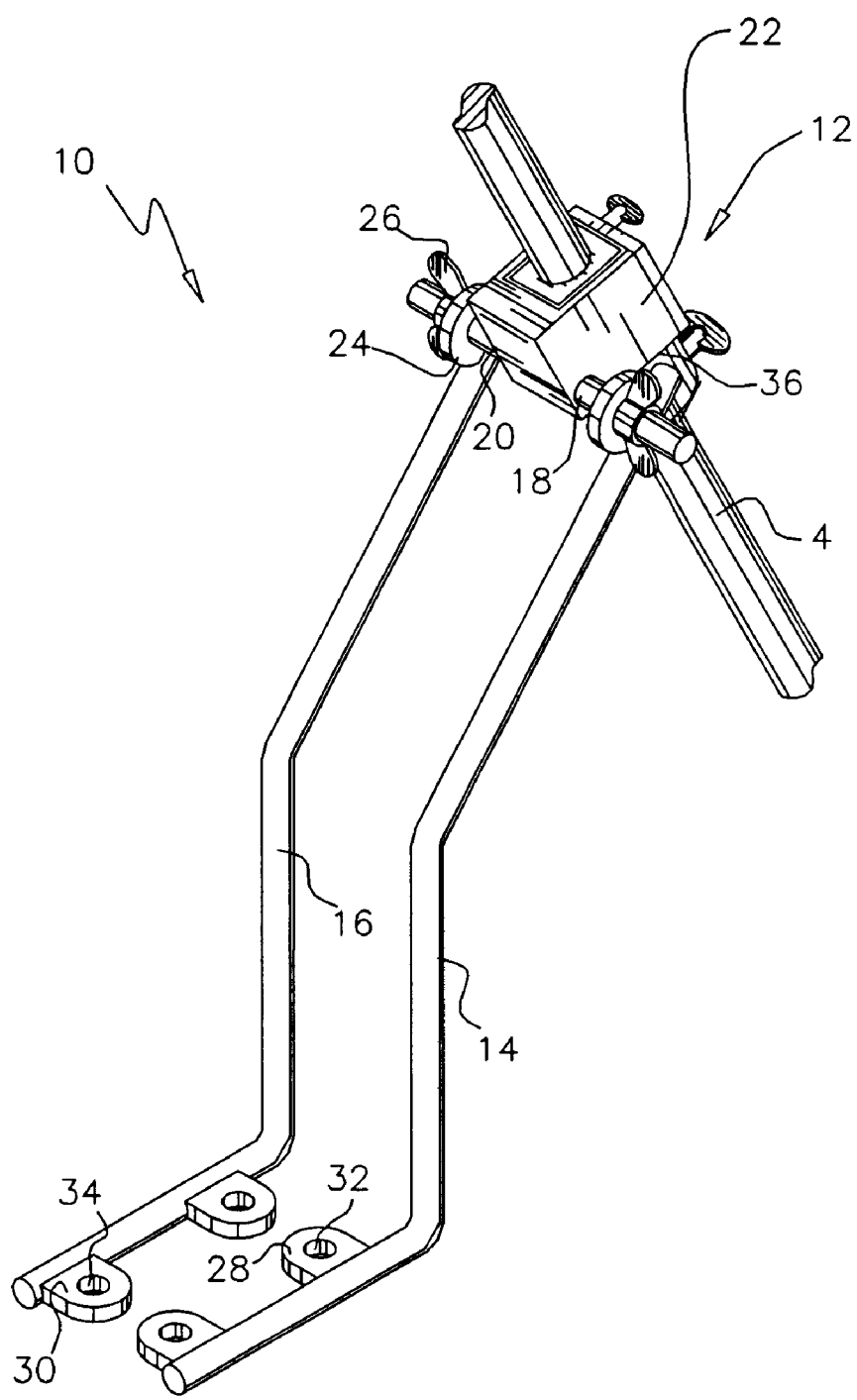
FIG. 2 is an environmental, perspective view of FIG. 1.

Turning now to FIGS. 1 and 2 of the drawings, bracket 10 is shown suspending washing apparatus 2 from an upwardly extending tubular frame member 4 of a cart (not shown in its entirety). Washing apparatus 2 includes a basin or receptacle at least partially filled with a cleaning fluid (not shown). Frame member 4 extends in a direction from the lowermost member of the cart to the uppermost member. As seen in the depiction of FIG. 1, frame member 4 is inclined from the vertical direction. Bracket 10 includes a connector 12 for engaging the frame member of the cart and two support arms 14, 16 depending pivotally from connector 12. Bracket 10 includes gimbals apparatus fixed thereto so that arms 14, 16 can maintain constant orientation relative to a vertical direction regardless of inclination of frame member 4. The gimbals apparatus includes rods 18, 20 on which arms 14, 16 are pivotally mounted.

Connector 12 comprises a sleeve 22 which encircles frame member 4. Rod 18 projects laterally from sleeve 22. Arm 14 terminates in a bearing 24 pivotally engaging rod 18. A readily releasable fastener such as wing nut 26 retains bearing 24 on rod 18. Rod 18 has a shoulder (not shown) or a jam nut (not shown) to prevent bearing 24 from moving against sleeve 22 when wing nut 26 is tightened. Arm 14 has two tabs 28, 30 each having a respective hole 32 or 34 passing therethrough. As seen in FIG. 1, fasteners 6 pass through tabs 28, 30 to secure washing apparatus 2 to bracket 10. Bracket 10 is generally bilaterally symmetrical, with rods 18, 20 located on opposite sides of sleeve 22 from one another. Also, rod 20 and arm 16 have essentially mirror image construction compared to rod 18 and arm 14, and thus will not be described in further detail.

Arms 14, 16 are dimensioned and configured to hold washing apparatus 2 such that longitudinal axis 8 of washing apparatus 2 is oriented at an angle A in a range of forty degrees to fifty degrees from a horizontal direction. This orientation is a convenient position for enabling a person to insert an object such as a golf club (not shown) into the receptacle of washing apparatus 2 from above.

Figure 3C:
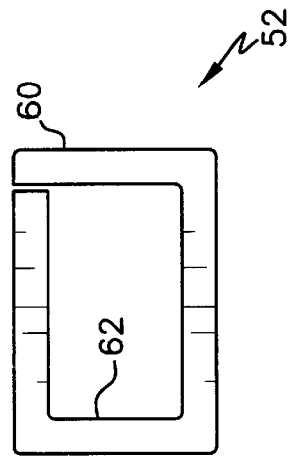
FIG. 3C is an enlarged top plan detail view of an alternative embodiment of the adapter shown in FIG. 3B.
Figure 3D:
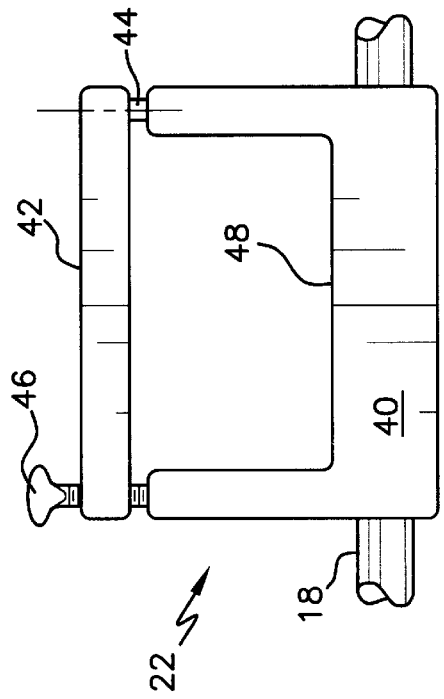
FIG. 3D is an enlarged top plan detail view of a sleeve shown in FIG. 1.
Figure 3B:
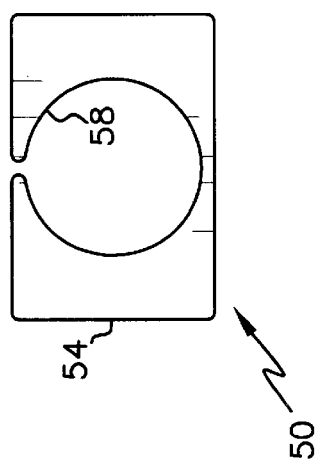
FIG. 3B is an enlarged top plan detail view of one embodiment of an adapter concealed from view in FIG. 1.
Figure 3A:
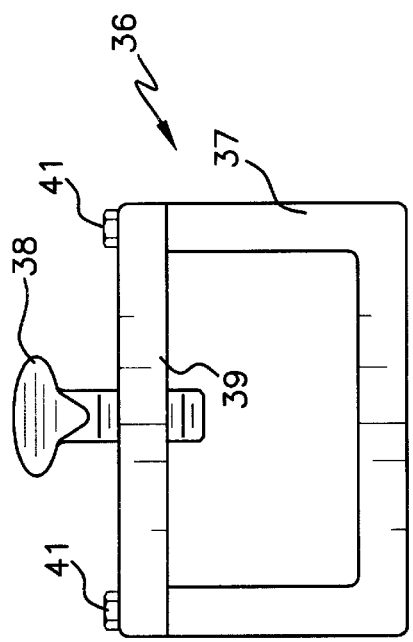
FIG. 3A is an enlarged top plan detail view of a stop shown in FIG. 1.

Connector 12 is prevented from sliding downwardly along frame member 4 by a stop 36 shown in FIG. 3A. Stop 36 comprises a collar 37 or the like which fits loosely over frame member 2. A winged setscrew 38 secures stop 36 to frame member 4. Collar 37 has a cap 39 secured to collar 37 by bolts 41. Sleeve 22 is seen to comprise a U-shaped base 40 and a closure 42. Closure 42 is pivotally mounted to base 40 on axle 44. A winged setscrew 46 secures closure 42 in place when sleeve 22 has engaged frame member 4. Sleeve 22 has a large, rectangular opening 48 large enough to encircle frame members of different dimensions and configurations.

Several adapters, such as adapters 50, 52 (shown in FIGS. 3B and 3C, respectively) are provided to enable sleeve 22 to cooperate closely with frame members of different configurations. Adapter 50 has an external surface 54 dimensioned and configured to cooperate with internal surface 48 of sleeve 22 (see FIG. 3D) and an internal surface 58 dimensioned and configured to cooperate with round or circular frame members. Adapter 52 has an external surface 60 dimensioned and configured to cooperate with internal surface 56 of sleeve 22 and an internal surface 62 dimensioned and configured to cooperate with polygonal frame members, where frame members are square, rectangular, hexagonal, octagonal, configured as I-beams, and the like. The adapters are configured to be slipped over the frame member prior to sleeve 22 being installed thereover, and are formed from a sufficiently flexible material so as to spread open or otherwise deform to slip over the frame member.

Figure 4:
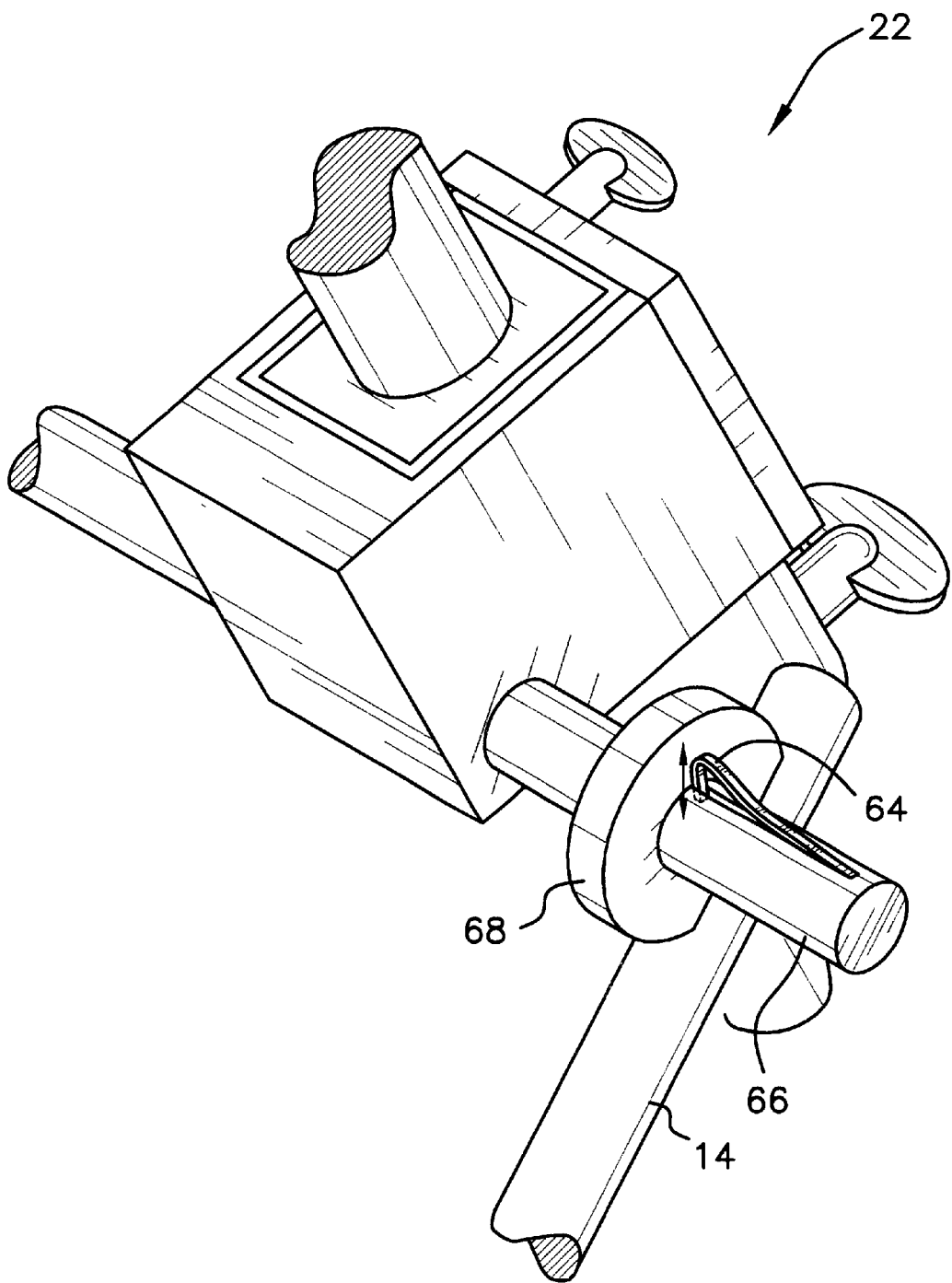
FIG. 4 is an enlarged environmental front perspective detail view of an alternative embodiment of the invention, showing components corresponding to the upper left of FIG. 2.

FIG. 4 shows an alternative embodiment of the invention wherein the releasable fastener which retains bearing 24 (see FIG. 1) on rod 18 is a spring catch 64 employed in place of wing nut 26 of FIG. 1. Spring catch 64 is fixed to rod 66 and is urged by spring action to project upwardly to the position shown in FIG. 4. Rod 66 is configured such that spring catch 64 can be retracted, or moved downwardly where it will not interfere with bearing 68 of arm 14. This allows a user to slide rod 66 out from engagement with arm 14 from rod 66 when disassembly is being performed. Arm 16 is similarly disengaged for disassembly.

Figure 5:
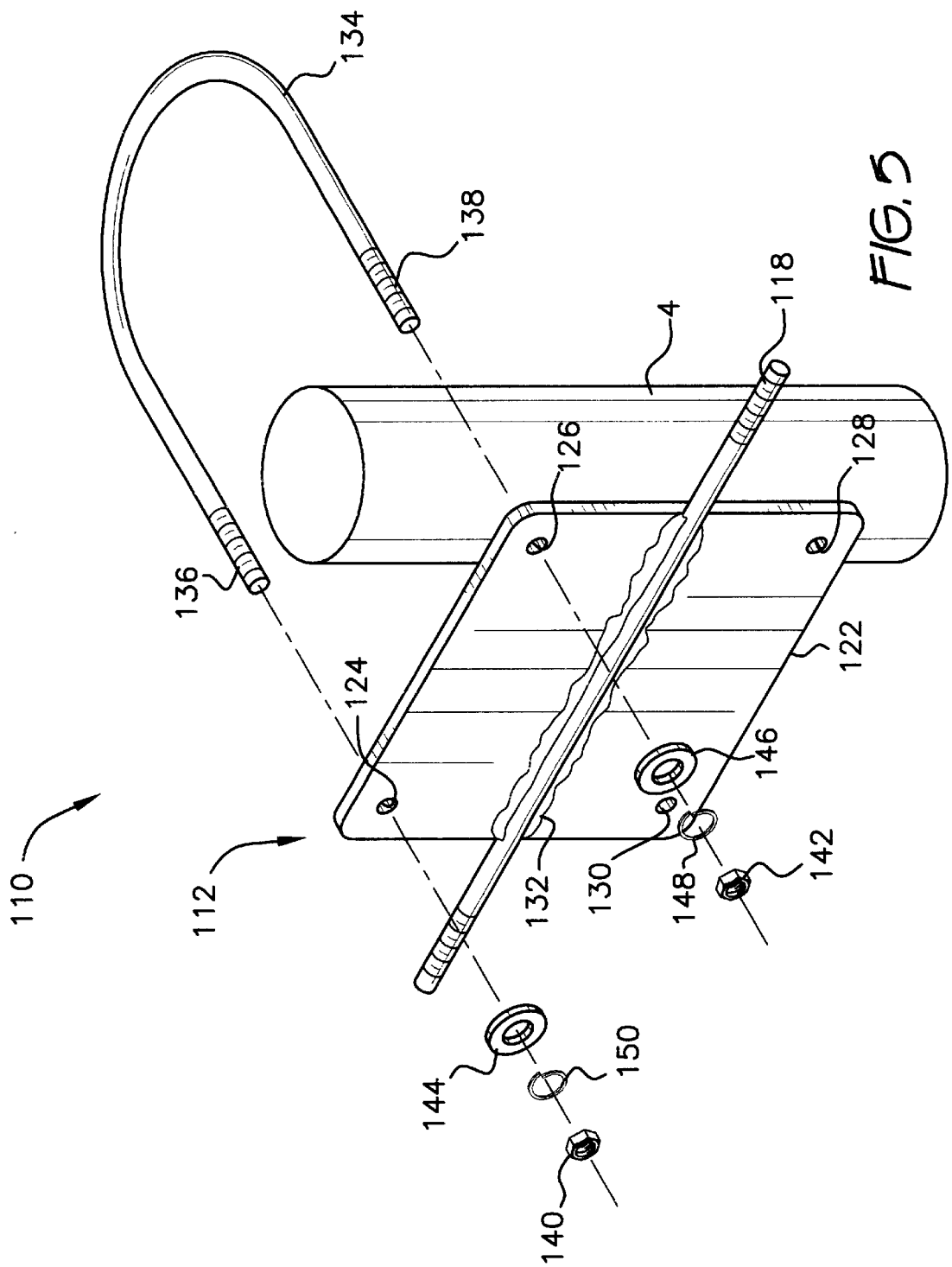
FIG. 5 is an exploded perspective detail view of an alternative embodiment of the invention.
Figure 6:
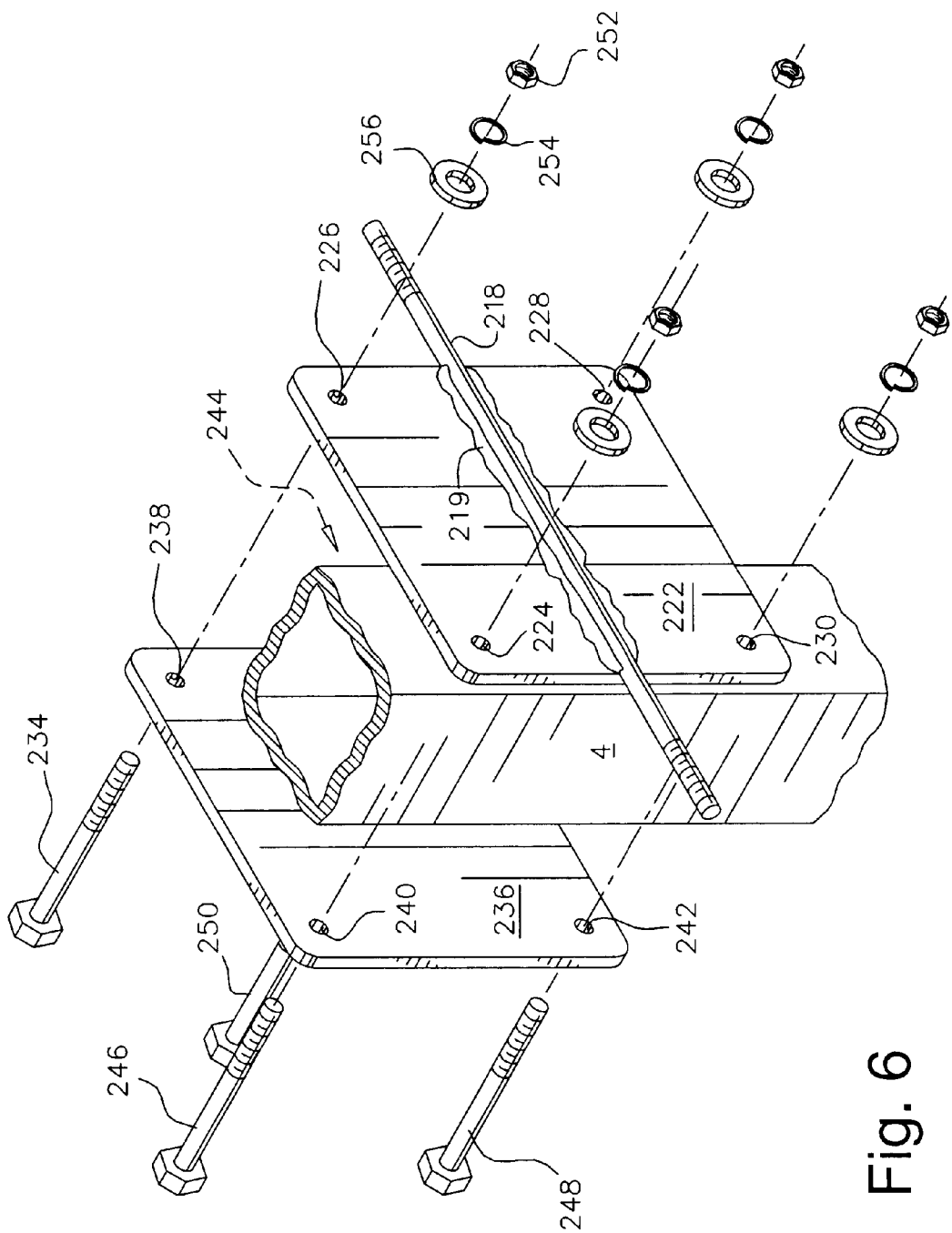
FIG. 6 is an exploded perspective detail view of an alternative embodiment of the invention.

FIGS. 5 and 6 show alternative embodiments of the invention wherein connectors 112, 212 (respectively) utilizing clamps which are substituted for sleeve 22 and its adapters 50, 52 of the embodiment of FIG. 1. FIG. 5 is an embodiment intended to be utilized in those cases wherein frame member 4 is circular in cross section. Connector 112 comprises a plate 122 having four holes 124, 126, 128, 130. Plate 122 is preferably welded (indicated by welding bead 132) to rod 118, which rod 118 is equivalent in function to rod 18 of the embodiment of FIG. 1. A U-bolt 134 encircles frame member 4 and its ends 136, 138 are passed through holes 124, 126 of plate 122. U-bolt 134 is secured in place by nuts 140, 142, which are placed over respective flat washers 144, 146 and lock washers 148, 150. A second U-bolt (not shown) is placed over frame member 4 and passed through holes 128, 130 of plate 122, and is secured by hardware similar to that employed to secure U-bolt 134. Frame member 4 is thereby clamped between U-bolt 134 and plate 122.

The embodiment of FIG. 6 is utilized with frame members 4 of square or rectangular cross sectional configuration. A plate 222 is fixed to rod 218, which rod 218 is equivalent in function to rod 18 of the embodiment of FIG. 1. Preferably, rod 218 is welded (shown representatively by welding beads 219) to plate 222. Plate 222 has four holes 224, 226, 228, 230. A plate 236 which is generally similar to plate 222 has holes 238, 240, 242, 244 which are alignable with holes 224, 226, 228, 230 of plate 222. A bolt 234 is passed through hole 238 of plate 236 and through hole 224 of plate 222. Frame member 4 is entrapped between plates 222 and 236. Additional bolts 246, 248, 250 are passed through the remaining holes 240, 242, 244 of plate 236 and holes 226, 228, 230 of plate 222. Bolt 234 is secured in place by a nut 252 and lock washer 254 seated on a flat washer 256. Bolts 246, 248, 250 are secured in a manner similar to that of bolt 234. When bolts 234, 246, 248, 250 are secured, frame member 4 is securely clamped between plates 222 and 236.

The invention is susceptible to variations and modifications which may be introduced thereto without departing from the inventive concept. For example, stop 36 of FIG. 3A could be replaced by any member which prevents sleeve 22 from sliding along frame member 4.

It is to be understood that the present invention is not limited to the embodiments described above, but encompasses any and all embodiments within the scope of the following claims.

I claim:

1. A bracket for suspending washing apparatus from a cart having an upwardly extending frame member, comprising:

a connector for engaging the frame member of the cart;

said connector further comprising a sleeve disposed within a central region of said connector and adapted to substantially completely encircle said frame member;

a stop disposed external to said connector to prevent said sleeve from sliding downwardly along said frame member;

said connector comprising gimbals apparatus affixed thereto; and wherein said bracket has two support arms pivotally supported on said sleeve, and said gimbals apparatus includes a first rod projecting laterally from said sleeve, a readily releasable fastener disposed to retain one said support arm to said first rod, a second rod projecting laterally from said sleeve and located on an opposite side of said sleeve from said first rod, and a second readily releasable fastener disposed to retain the other said support arm to said second rod, said support arms having attachment apparatus to engage the washing apparatus, wherein said washing apparatus maintains a constant angle of orientation independent of the angle of the frame member.

2. The bracket according to claim 1, wherein said sleeve includes an adapter having an external surface dimensioned and configured to cooperate with said sleeve and an internal surface dimensioned and configured to cooperate with a frame member of the cart, said frame member of the cart having a predetermined shape from the group consisting of: tubular, square, rectangular, I-beam shaped and polygonal.

3. The bracket according to claim 1, wherein said support arm is dimensioned and configured to hold the washing apparatus such that a longitudinal axis of the washing apparatus is oriented at an angle of between forty and fifty degrees from a horizontal direction.

4. The bracket according to claim 1, wherein said connector comprises a clamp having threaded fasteners disposed to close said clamp over said frame member of the cart.

5. A bracket for suspending washing apparatus from a cart having an upwardly extending frame member, comprising:

a connector for engaging the frame member of the cart, comprising a sleeve disposed to encircle the frame member of the cart, a stop disposed to prevent said sleeve from sliding downwardly along the frame member, and an adapter having an external surface dimensioned and configured to cooperate with said sleeve and an internal surface dimensioned and configured to cooperate with the frame member of the cart;

gimbals apparatus fixed to said connector, comprising a first rod projecting laterally from said connector and a second rod projecting laterally from said connector; and a first support arm supported on said gimbals apparatus so as to depend pivotally from said connector, said first support arm having attachment apparatus to engage the washing apparatus, and a second support arm supported on said gimbals apparatus so as to depend pivotally from said connector, said second support arm having attachment apparatus to engage the washing apparatus, wherein said first support arm and said second support arm are each dimensioned and configured to hold the washing apparatus such that the longitudinal axis of the washing apparatus is oriented at an angle in a range of forty degrees to fifty degrees from a horizontal direction and wherein said first rod has a readily releasable fastener disposed to retain said first support arm to said first rod, and a second rod has a readily releasable fastener disposed to retain said second support arm to said second rod.

* * * * *